United States Patent [19]
Tibbles

[11] Patent Number: 5,383,812
[45] Date of Patent: Jan. 24, 1995

[54] RADIO CONTROL VALVE FOR A CONTINUOUSLY VARIABLE TRANSMISSION

[75] Inventor: Thomas T. Tibbles, Livonia, Mich.

[73] Assignee: Ford Motor Company, Dearborn, Mich.

[21] Appl. No.: 27,998

[22] Filed: Mar. 8, 1993

[51] Int. Cl.[6] .............................................. F16H 59/00
[52] U.S. Cl. ..................................................... 474/28
[58] Field of Search .................. 474/8, 11, 12, 17, 18, 474/28, 69, 70; 74/867, 869

[56] References Cited

U.S. PATENT DOCUMENTS

| | | | |
|---|---|---|---|
| H398 | 1/1988 | Lemieux et al. | 74/689 |
| 4,116,080 | 9/1978 | Berens | 74/230.17 |
| 4,515,040 | 5/1985 | Takeuchi et al. | 74/866 |
| 4,543,077 | 9/1985 | Yamamuro et al. | 474/12 |
| 4,546,773 | 10/1985 | Shigematsu et al. | 74/866 |
| 4,583,423 | 4/1986 | Hahne | 74/689 |
| 4,653,004 | 3/1987 | Osanai et al. | 364/424.1 |
| 4,658,360 | 4/1987 | Osanai et al. | 364/424.1 |
| 4,663,990 | 5/1987 | Itoh et al. | 74/866 |
| 4,683,779 | 8/1987 | Osanai et al. | 74/861 |
| 4,736,301 | 4/1988 | Osanai | 364/424.1 |
| 4,767,384 | 8/1988 | Moan | 474/28 |
| 4,823,267 | 4/1989 | Kumura | 364/424.1 |
| 4,829,433 | 5/1989 | Nakano et al. | 364/424.1 |
| 4,857,034 | 8/1989 | Kouno et al. | 474/28 |
| 4,867,732 | 9/1989 | Soga et al. | 474/28 |
| 4,876,920 | 10/1989 | Eichenberger | 74/689 |
| 4,955,260 | 9/1990 | Oshidari | 474/28 X |
| 5,052,980 | 10/1991 | Itoh et al. | 474/11 |
| 5,169,366 | 12/1992 | Reniers | 474/18 X |

FOREIGN PATENT DOCUMENTS

| | | |
|---|---|---|
| 0235712 | 1/1987 | European Pat. Off. . |
| 0272109 | 11/1987 | European Pat. Off. . |
| 2443598 | 8/1978 | France . |
| 3409934A1 | 1/1985 | Germany . |

*Primary Examiner*—Michael Powell Buiz
*Attorney, Agent, or Firm*—Roger L. May; Frank G. McKenzie

[57] ABSTRACT

A continuously variable transmission control system having adjustable driving and driven sheave assemblies (124,126) connected drivably by a torque transfer belt or chain (144), each sheave assembly having a fluid pressure operated servo with a pressure chamber, distribution of control pressure to one servo (150,158,162) effecting a transmission ratio adjustment, control of pressure distribution to the other servo (202,210) resulting in a clamping force, a ratio control valve (246) for controlling distribution of pressure to the ratio controlling servo to effect upshifts and downshifts, provision being made for stabilizing the ratio control valve by providing for flow entry to the ratio control valve that is unrestricted, flow distribution to the ratio controlling servo having a controlled restriction whereby stability of the ratio control valve is achieved, fluid displaced from the ratio controlling servo being adapted to circulate through the ratio control valve to the inlet side (372) of the control system pump (70,72).

7 Claims, 12 Drawing Sheets

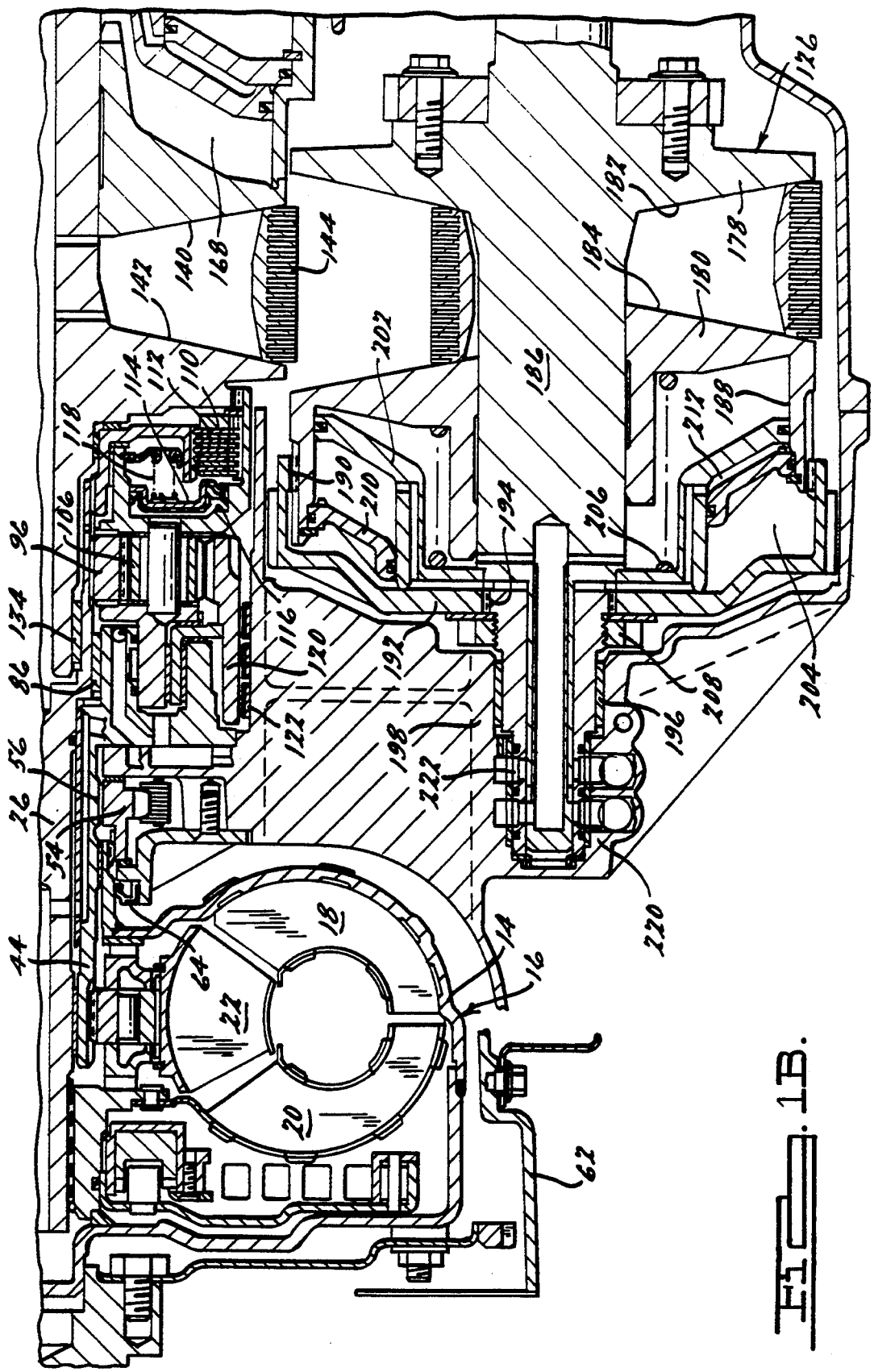

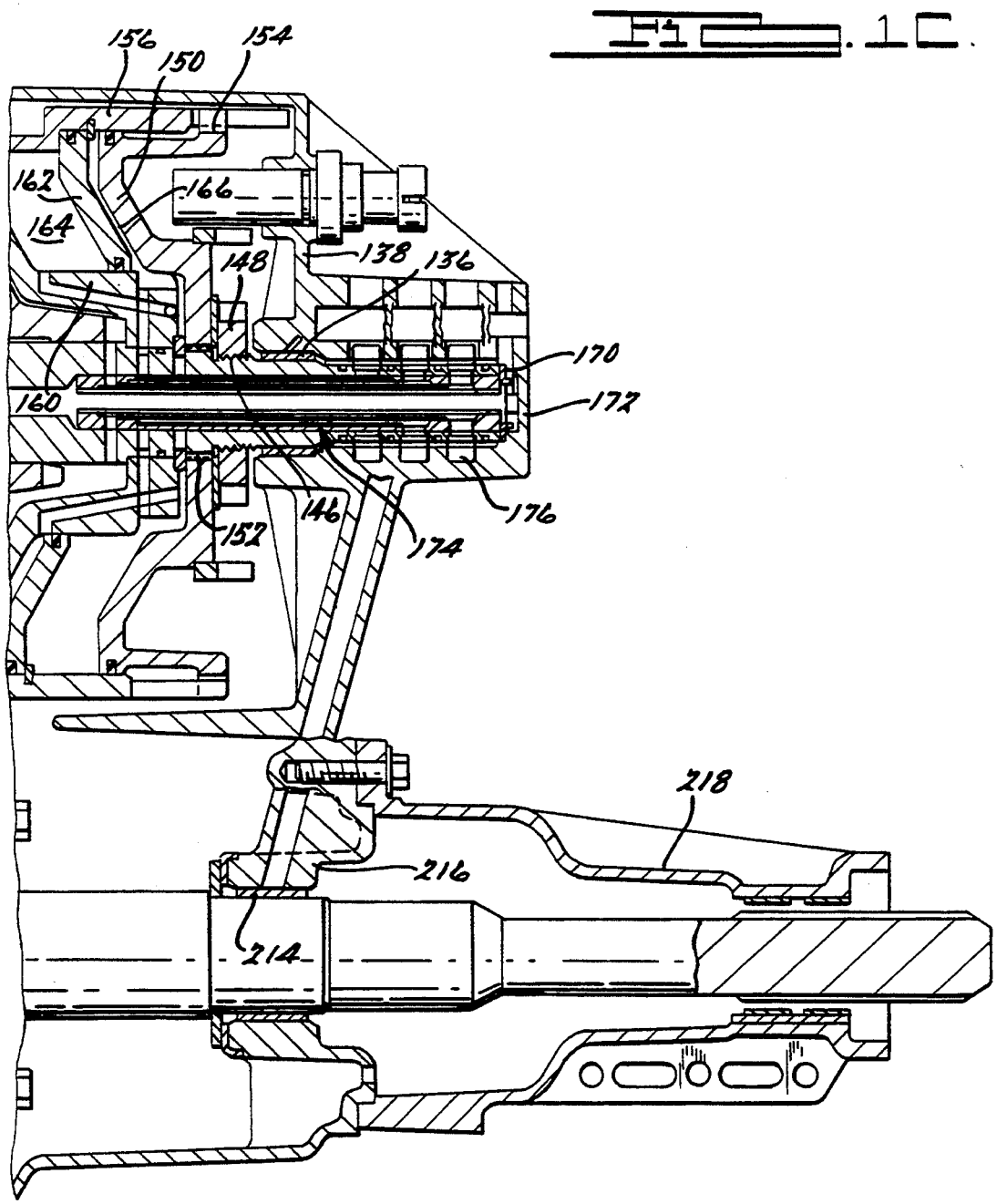

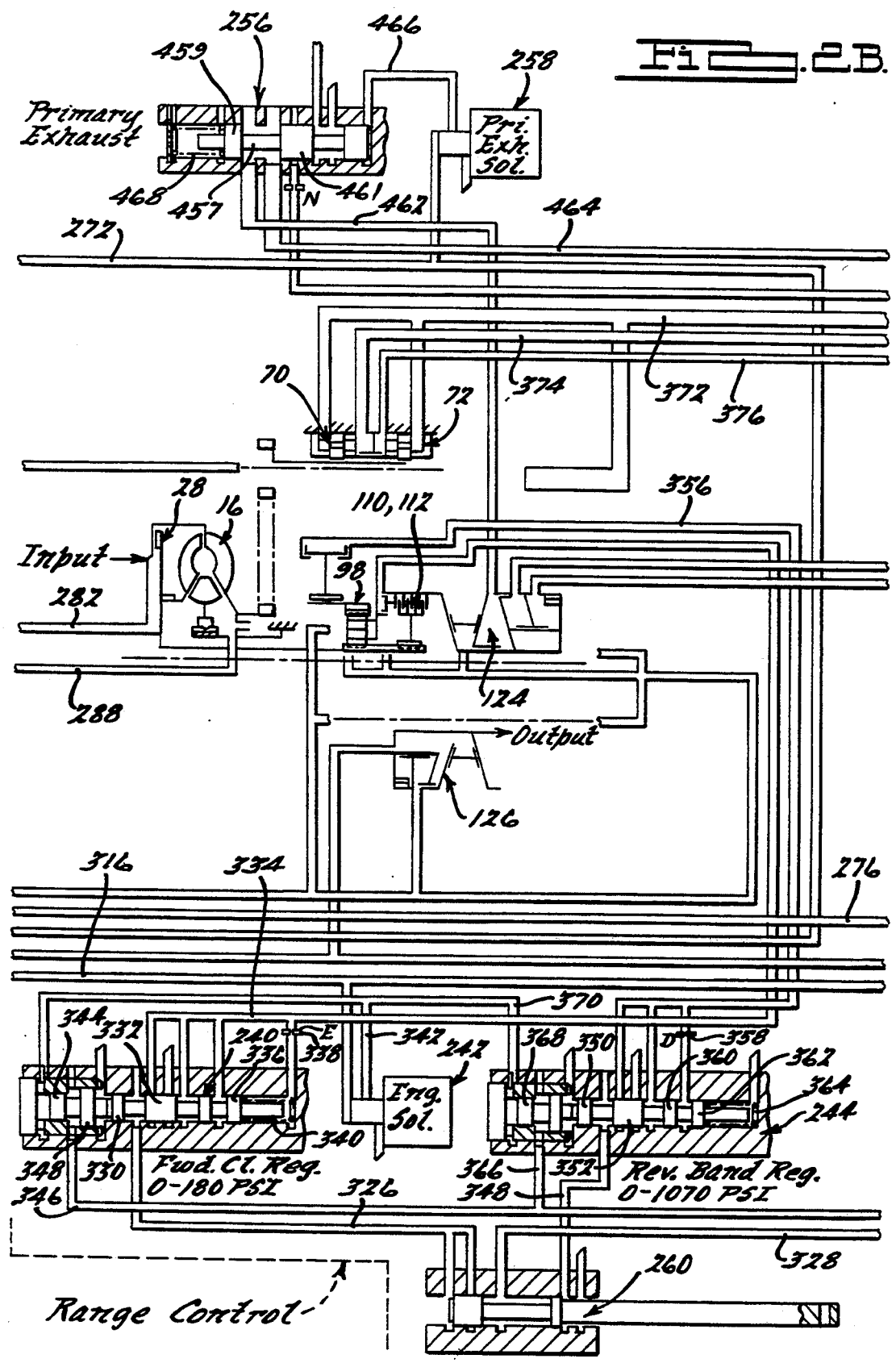

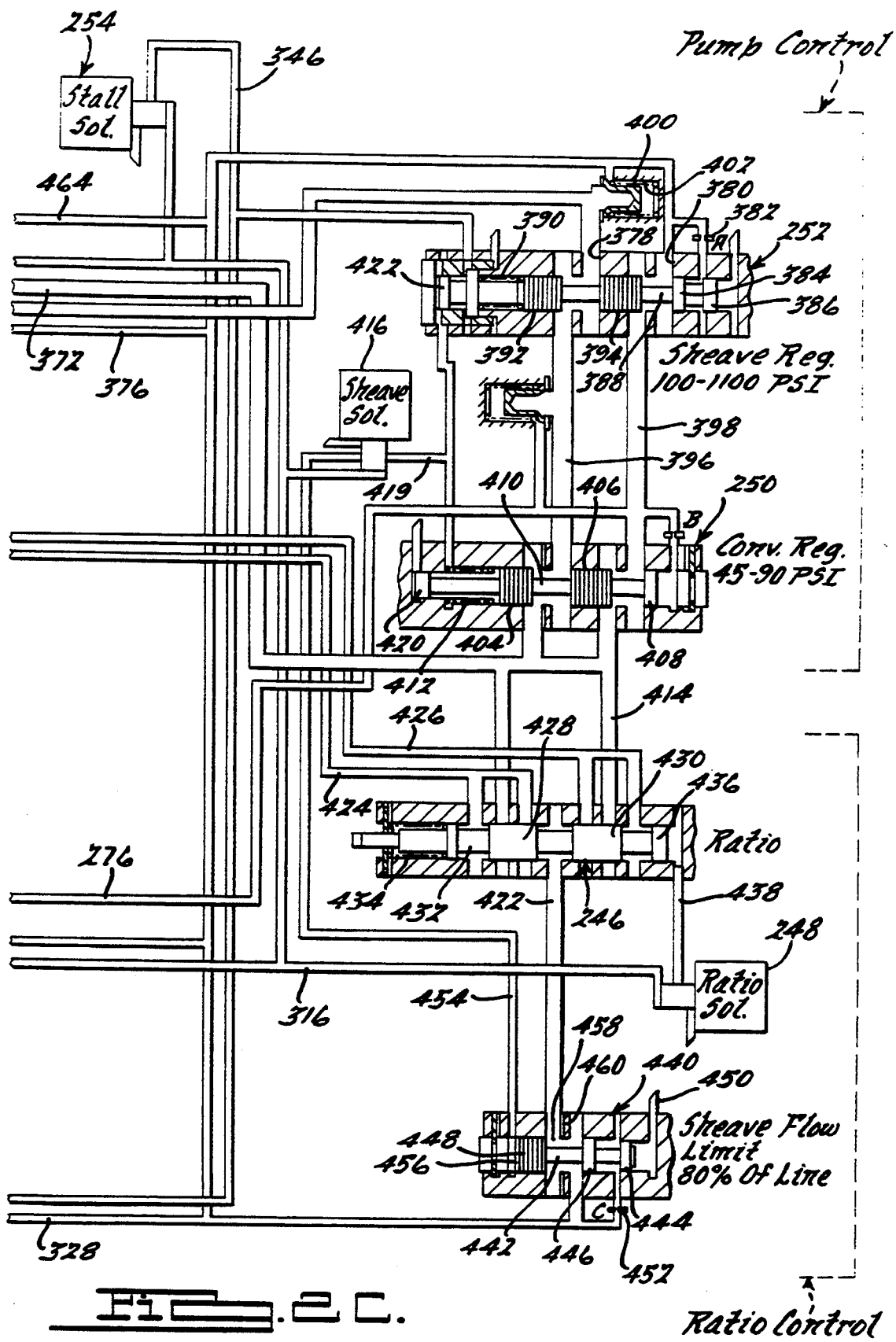

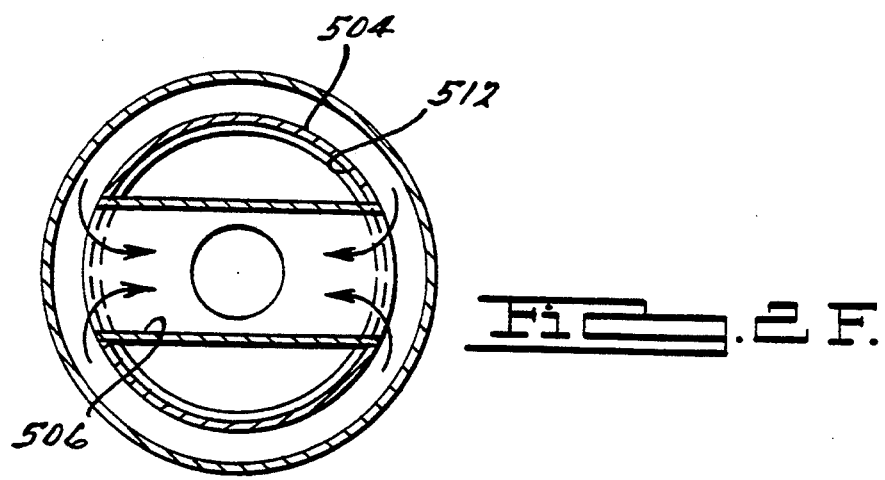
FIG. 2F.
FIG. 2G.
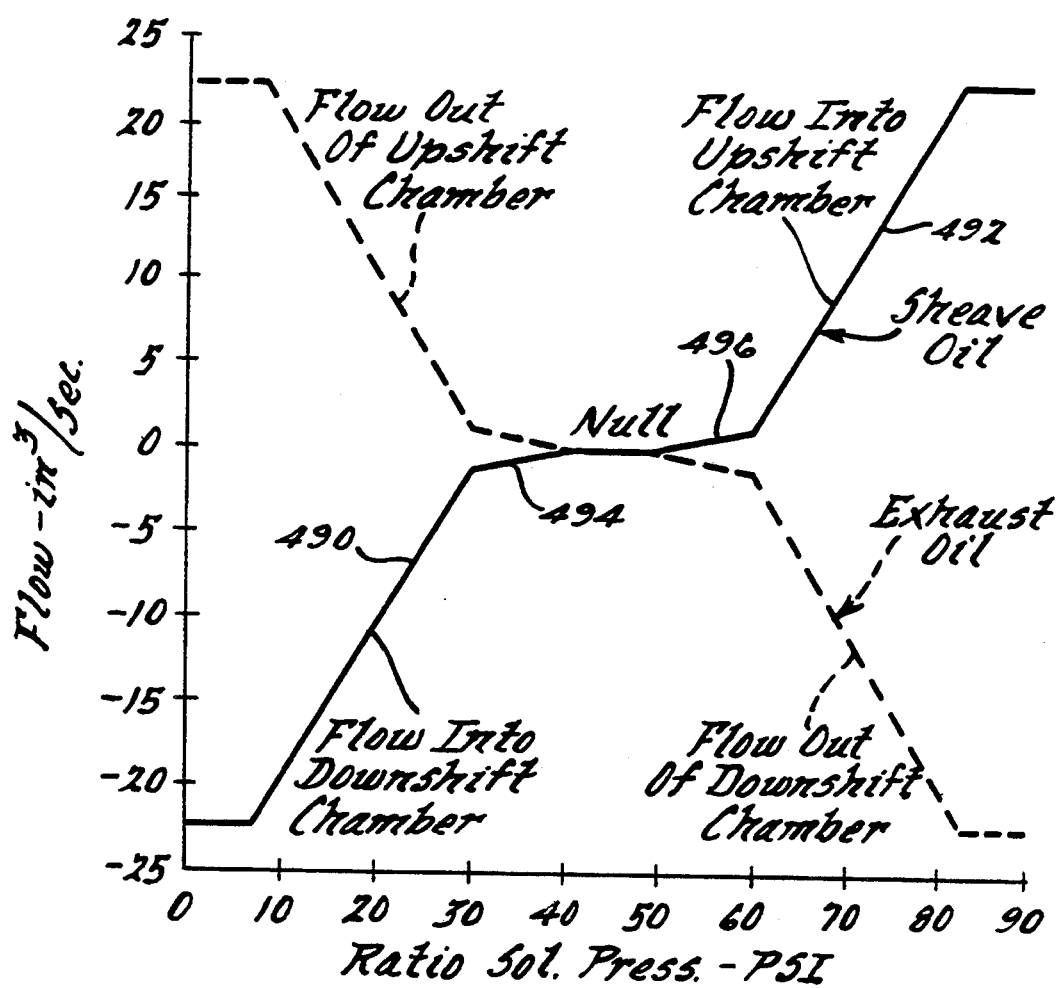

SOLENOID LOGIC

| STALL SOLENOID VFS(NH) | SHEAVE SOLENOID VFS(NH) | ENGAGEMENT SOLENOID VFS(NH) | SHEAVE CAPACITY | FWD/REV CAPACITY | COMMENTS |
|---|---|---|---|---|---|
| OFF | OFF | OFF | FULL STALL | FULL STALL | LIMP HOME/MAX LINE |
| OFF | OFF | ON | FULL STALL | FULL ENG. | |
| OFF | ON | OFF | FULL ENG. | FULL ENG. | |
| OFF | ON | ON | FULL ENG. | FULL ENG. | |
| ON | OFF | OFF | FULL ENG. | FULL ENG. | |
| ON | OFF | ON | FULL ENG. | ZERO | CRUISE |
| ON | ON | OFF | MIN. LINE | MIN. LINE | |
| ON | ON | ON | MIN. LINE | ZERO | "N" IDLE/ENGAGE |

| CONV. CLUTCH SOLENOID VFS(NL) | CONV. CLUTCH CAPACITY | COMMENTS |
|---|---|---|
| OFF | ZERO | LIMP HOME/OPEN |
| ON | MAX AVAILABLE | LOCKED UP/CRUISE |

| RATIO SOLENOID VFS(NH) | RATIO | COMMENTS |
|---|---|---|
| OFF | OD | LIMP HOME/CRUISE |
| ON | UD | DRIVEAWAY |

| LUBE SOLENOID ON/OFF(NL) | PRIMARY & SECONDARY SHAFT LUBE | COMMENTS |
|---|---|---|
| OFF | ON | LIMP HOME |
| ON | OFF | IDLE ONLY |

| PRIMARY EXH SOLENOID ON/OFF(NL) | PRIMARY SHEAVE | COAST PUMP CLUTCH | COMMENTS |
|---|---|---|---|
| OFF | LINE | OFF | LIMP HOME |
| ON | EXHAUST | ON | BRAKE COAST ONLY |

FIG. 3A.

| ORIFICE SIZES | | |
|---|---|---|
| DESIGNATION LETTER | DIAM. (MM) | FUNCTION |
| A | 1.0 | DAMP SHEAVE REGULATOR |
| B | 1.0 | DAMP CONVERTER REGULATOR |
| C | 1.0 | DAMP SHEAVE FLOW LIMIT |
| D | 1.0 | DAMP REVERSE BAND REGULATOR |
| E | 1.0 | DAMP FORWARD CLUTCH REGULATOR |
| F | 1.0 | DAMP VFS SOLENOID REGULATOR |
| G | 1.0 | DAMP ON/OFF SOLENOID REGULATOR |
| H | 1.5 | SETS COOLER FLOW WHEN CONVERTER IS LOCKED |
| J | 1.0 | DAMP CONVERTER CLUTCH REGULATOR |
| K | 1.5 | RESTRICT CONV. REG. TO CONV. CLU. REG. VALVE |
| M | 1.5 | FEED TO CONV. WHEN CONV. REG. IS CLOSED |

FIG. 3B.

RADIO CONTROL VALVE FOR A CONTINUOUSLY VARIABLE TRANSMISSION

TECHNICAL FIELD

This invention comprises improvements in a valve system for a continuously variable transmission in an automotive vehicle driveline.

BACKGROUND OF THE INVENTION

The control valve system of my invention is adaptable for a transmission of the kind disclosed in U.S. Pat. No. 4,767,384 of Richard D. Moan, which is assigned to the assignee of my present invention.

A continuously variable transmission usually includes adjustable sheaves and a chain or belt arranged between the driving sheave assembly and the driven sheave assembly. The driving sheave assembly may be connected to an internal combustion engine for a vehicle in an automotive vehicle driveline, and the driven sheave assembly may be connected through gearing and through a driveshaft and axle assembly to the vehicle traction wheels. By controlling the effective pitch radius of the sheave assemblies, the torque ratio can be varied between underdrive and overdrive. By appropriately calibrating the ratio changing characteristic and matching that characteristic with the speed/torque characteristic of the internal combustion engine, the powertrain package may achieve a minimum brake specific fuel consumption condition for each engine throttle setting.

The primary sheave assembly in a continuously variable transmission of this kind normally is used as the ratio controller, and the secondary sheave assembly normally is used to control belt loading. Each sheave assembly has a pressure operated servo with an expandable working pressure chamber. The servo is adjusted hydraulically to effect a change in the pitch radius of the sheave assembly. By varying the effective pressure on the primary sheave assembly, the ratio of the drive can be changed. The clamping force is controlled by maintaining an effective working pressure in the secondary sheave assembly.

A fluid pressure pump driven by the engine may be used as a pressure source for a control system that controls the adjustment of the primary servo and the secondary servo. A regulator valve in the control system in a preferred embodiment of the invention achieves the desired working pressure in the sheave assembly so that slippage of the belt or chain will not occur. A ratio control valve in the control system controls pressure distribution to the primary sheave assembly during ratio changes.

BRIEF DESCRIPTION OF THE INVENTION

The valve system of my invention includes improvements in a ratio valve that controls the rate of change of ratio. It is a four-way flow valve that controls the flow into and out of ratio controlling pressure chambers in the primary sheave assembly, one chamber being used to achieve an upshift and the other chamber being used to achieve a downshift. The position of the valve determines the flow distribution into and out of these upshift and downshift chambers. A variable force solenoid valve is used to actuate the ratio valve. The variable force solenoid valve is under the control of a microprocessor that receives control signals developed by sensors that measure throttle position, engine speed, mass air flow in the engine intake manifold, the primary sheave assembly speed, the secondary sheave assembly speed, oil temperature and a transmission range selector position.

The ratio control valve of my invention is adapted to operate in any one of three different operating states, depending upon its position, to supply oil regulated by a sheave regulator valve that communicates with the transmission pump. Oil is delivered to the upshift circuit during a ratio change toward overdrive while downshift oil is distributed to an exhaust port. Supply oil is delivered to the downshift circuit while the upshift oil is exhausted in order to achieve a ratio change toward the underdrive position. Fluid in the upshift chamber and in the downshift chamber can be trapped by the ratio control valve in order to establish a so-called null state during which the transmission ratio remains constant.

The improved ratio valve of my invention is characterized by a valve geometry that allows oil entering the valve to be unrestricted. The valve restricts distribution of pressure to and from the upshift and downshift chambers. Oil that is delivered from the valve is restricted by a valve land that registers with a port formed in a valve opening in which the valve land is situated. This improves the stability of the valve and makes it possible to control ratios with precision.

Oil exhausted from the ratio valve of my invention is directed to the pump inlet. The oil that is distributed from the ratio valve is joined with other exhaust oil from the hydraulic controls downstream from the transmission control system filter in such a manner that energy is transferred from the oil exhausted from the ratio control valve to makeup oil that passes through the filter. Thus, the oil exhausted from the ratio control valve is used to supercharge the pump inlet. This prevents cavitation of the pump and lowers the pumping torque requirements.

In a preferred embodiment of my invention, the main pressure chambers for the primary and secondary sheave assemblies are in fluid communication so that an increase in the volume of the main pressure chamber for the primary sheave assembly, upon a command for an increase in the drive ratio, will be accompanied by a corresponding decrease in the volume of the main pressure chamber for the secondary servo. The net volume of fluid for both main pressure chambers will remain substantially unchanged, except for leakage. Thus, the fluid volume that must be delivered to the primary sheave assembly to achieve the change in ratio, as the conical sheave portions are adjusted, is a minimum. That minimum volume is the volume that must be delivered to either an upshift pressure chamber or a downshift pressure chamber.

BRIEF DESCRIPTION OF THE DRAWINGS

FIGS. 1A, 1B and 1C, taken together, show an infinitely variable transmission comprising a hydrokinetic torque converter, forward and reverse gearing, and primary and secondary sheave assemblies;

FIGS. 2A, 2B and 2C, taken together, show a control valve system for controlling the transmission of FIGS. 1A, 1B and 1C;

FIG. 2F is a cross-sectional view taken along the plane of section lien 2F—2F of FIG. 2E;

FIG. 2G is a graph showing the rate of flow of fluid into and out of the upshift and downshift pressure chambers of the continuously variable transmission;

FIG. 3A is a chart showing the solenoid logic for the control solenoids that form a part of the control valve system of FIGS. 2A, 2B and 2C;

FIG. 3B is a chart that describes the functions of the orifices found in the control system of FIGS. 2A, 2B and 2C.

PARTICULAR DESCRIPTION OF THE INVENTION

Figure 1A:
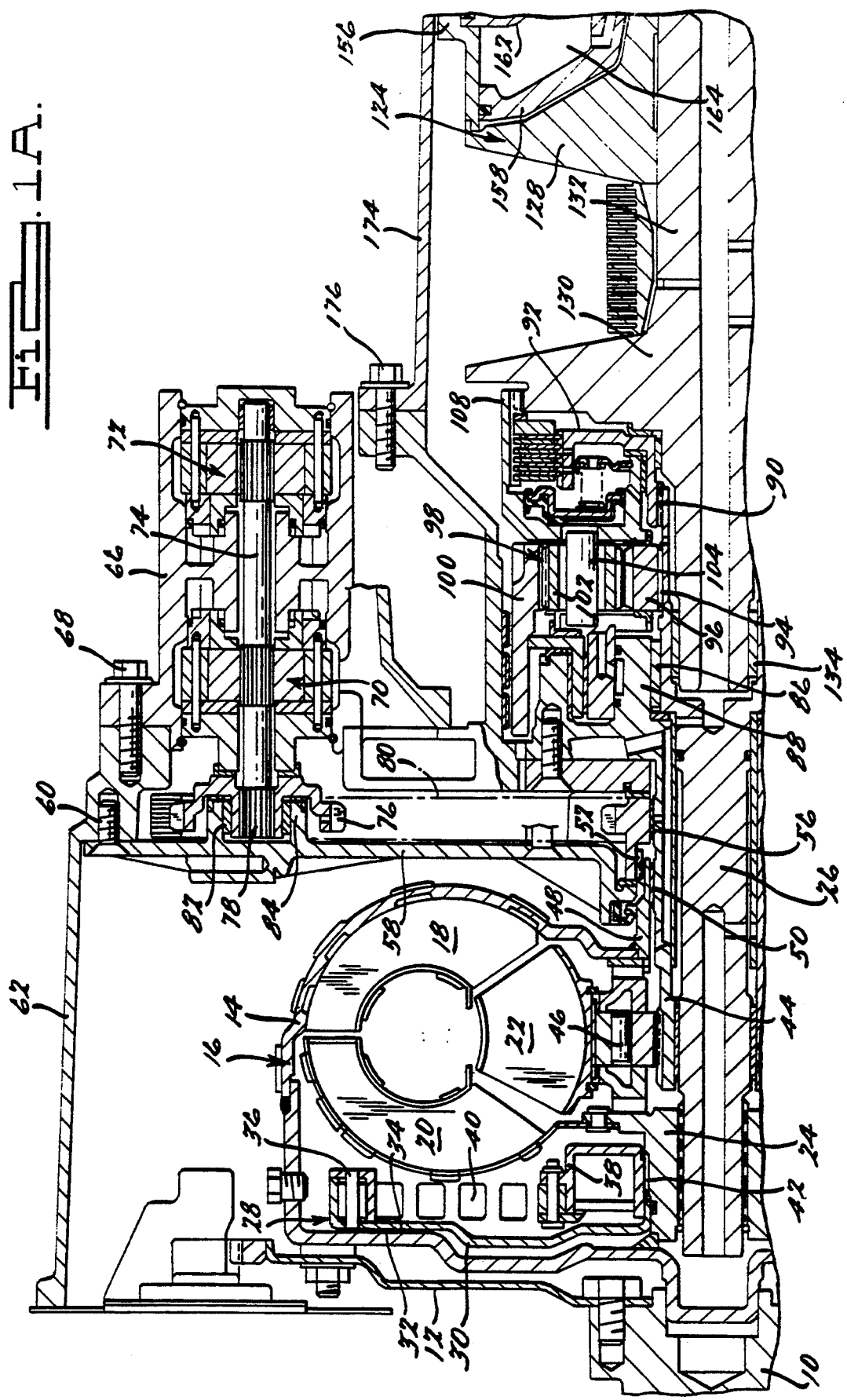

In FIG. 1A, numeral 10 designates the end of the crankshaft of an internal combustion engine, which is illustrated in the control overview of FIG. 4 in block diagram form. Crankshaft 10 is connected by drive plate 12 to the impeller housing 14 of a hydrokinetic torque converter 16. The impeller housing 14 has blades 18 forming an impeller assembly that is in fluid flow relationship with respect to a bladed turbine 20 and a bladed stator 22. The turbine 20 has a hub 24 which is splined to turbine shaft 26.

Torque converter bypass clutch assembly 28 comprises a clutch piston plate 30 having an annular friction surface 32 situated directly adjacent an annular friction surface 34 on the interior of the impeller shell 14. The clutch plate is connected at its outer periphery 36 to a damper hub 38 by means of a resilient damper element 40. The hub 38 is splined at 42 to the turbine hub 24.

Shaft 26 extends through a stationary sleeve shaft 44 for the stator assembly 22. The bladed portion of the stator assembly 22 is connected to the stator sleeve shaft 44 through an overrunning brake 46.

Impeller housing 14 has a hub 48 which is journalled by bushing 50 on stationary sleeve shaft 44. Hub 48 is drivably splined at 52 to pump drive sprocket 54, which also is journalled on the stationary sleeve shaft 44, bushing 56 being provided for this purpose.

A housing separator wall 58 is secured by bolts 60 to transmission housing portion 62, which encloses the torque converter 16. A fluid seal assembly 64 surrounding the impeller hub 48 is located in a central opening in the housing wall 58.

Pump housing 66 is joined to the transmission housing 62 by bolts 68. It contains two positive displacement pumps identified generally by reference numerals 70 and 72. The capacity of the pump 70 is larger than the capacity of pump 72. Each pump comprises a positive displacement pumping element that is splined drivably to a common pump drive shaft 74. A driven sprocket 76 for the pump drive is splined at 78 through the driveshaft 74. A drive chain shown at 80 drivably connects drive sprocket 54 to the driven sprocket 76. Sprocket 76 is journalled by bearing 82 in a bearing pocket 84 formed in the housing wall 58.

Turbine shaft 26 is journalled by bearing 86 in a bearing support 88, which forms a part of the stationary sleeve shaft 44.

Turbine shaft 26 is splined at 90 to clutch element 92 and is splined at 94 to sun gear 96, the latter forming a torque input element of a forward and reverse gear unit 98.

Gear unit 98 comprises also ring gear 100, which meshes with a first set of planet pinions 102 supported on carrier 104. Pinions 102 mesh with pinions 106 also supported on the carrier 104. Pinions 106 drivably engage sun gear 96.

A clutch drum 108 is connected directly to the carrier 104. It carries externally splined clutch discs 110, which frictionally engage internally splined discs 112 carried by the clutch hub 92.

A pressure actuated piston 114 situated in annular cylinder 116 engages the friction discs 110 and 112 when pressure is admitted to the working chamber defined by the cylinder 116 and the piston 114.

Ring gear 110 forms a part of a brake drum 120, which is surrounded by friction reverse brake band 122.

FIG. 1B shows the sheave drive which comprises a primary sheave assembly 124 and a secondary sheave assembly 126. Sheave assembly 124 comprises an adjustable sheave disc 128 and a fixed sheave disc 130. Sheave driveshaft 132 forms a part of the sheave disc 130. It is journalled at one end by bearing 134. It is journalled at the other end by bearing 136 located in a bearing opening formed in transmission housing end wall 138 as seen in FIG. 1B.

Sheave disc 128 has a conical friction drive surface 140. Disc 130 has a companion conical friction drive surface 142. A friction drive belt or chain 144 is situated between the conical friction drive surfaces and is arranged in frictional driving relationship with respect to the surfaces 140 and 142.

The shaft 132 is threaded at 146 to accommodate a clamping nut 148, which secures cylinder end plate 150 on the shaft 132. End plate 150 is provided with an internal opening which receives the shaft 132. It is connected drivably to the shaft 132 by drive spline 152.

The outer periphery of the drive plate 150 has a sliding key connection 154 with cylinder drum 156 which is secured to the outer margin of the adjustable sheave disc 128. The sliding key connection 154 accommodates axial movement of the cylinder 156 relative to the drive plate 150, although relative rotary movement is prevented.

A piston member 158 surrounds the shaft 132. It is provided with a hub 160 received in a central opening in piston member 162. It is secured at its outer margin to the interior of the cylinder 156. The piston members 158 and 162 cooperate to define an underdrive for downshift pressure chamber 164. Member 150 and piston member 162 cooperate to define an upshift pressure chamber 166. The member 158 and the disc 128 cooperate to define a line pressure chamber 168.

A thrust washer 170 is secured between the right-hand end of the shaft 132 and an end plate 172 on the transmission housing portion 174, the latter being secured to housing 62 by bolts 176 as seen in FIG. 1B.

Fluid pressure is distributed to the pressure chambers 168, 166 and 164 through a manifold assembly at the right-hand end of the shaft 132. This manifold assembly is defined by concentric pressure distributor tubes 174 which establish annular fluid flow passages communicating with the pressure chambers. These passages are connected to pressure distributor grooves, one of which is shown at 176 located in the housing portion 172.

The secondary sheave assembly 126 comprises a conical friction drive disc 178. A companion drive disc 180 is axially movable relative to the drive disc 178. Each is formed with a conical friction drive surface as seen at 182 and 184, respectively. A drive belt or chain 144 registers with the conical friction surfaces 182 and 184.

Drive disc 180 is axially movable on driven sheave shaft 186. It is provided with a cylinder portion 188, which is keyed at 190 to driven member 192. Member 192 is splined at 194 to shaft 186. The left end of the shaft 186 is journalled by bearing 196 in a bearing opening formed in a bearing pocket portion 198 of the housing 62. An annular piston plate 210 is secured to the cylinder portion 188 and moves with the sheave disc 180. It cooperates with piston 202, which in turn cooperates with plate 210 to define a line pressure chamber 204.

A compression spring 206 located in the cylinder portion 188 urges the disc 180 toward an underdrive position. A lock nut 208, which is threaded on the shaft 186, holds the member 192 axially fast against a shoulder on the shaft 186.

A balance pressure chamber 212 is defined by the piston plate 210 and piston 202. Centrifugal pressure developed in the pressure chamber 204 is substantially balanced by the counteracting centrifugal pressure developed in the chamber 212. The right-hand end of the shaft 186 is journalled by bearing 214 located in a bearing opening formed in bearing support wall 216. An output shaft extension housing 218 surrounds the right-hand end of the shaft 186. It is adapted to be connected to a driveshaft for the vehicle traction wheels through a universal joint assembly, not shown.

The gearing 98 is capable of establishing a forward drive and a reverse drive depending upon whether the brake band 122 is applied or the clutch, shown at 110 and 112, is applied. When the clutch is applied, sun gear 96 becomes connected to the carrier 104 so a one-to-one driving relationship exists between turbine shaft 26 and primary sheave shaft 132. If the clutch is released and the brake band 122 is applied, ring gear 100 acts as a reaction member. Driven torque delivered to the sun gear 96 will drive the carrier 104 in a reverse direction as the ring gear acts as a reaction member. Reverse motion of the carrier is transferred to the primary sheave assembly through the driving connection at 108.

Clamping pressure in pressure chamber 212 will prevent slippage of the belt or chain with respect to the sheaves. That same clamping pressure also acts on the primary sheave since the pressure chamber 168 is in fluid communication with the pressure chamber 212. During a ratio change from underdrive to overdrive, the volume of fluid in chamber 168 increases and the volume of fluid in the chamber 212 decreases. Conversely, a ratio change toward the underdrive position of the sheave assemblies will result in a decrease in the volume of fluid in the pressure chamber 168 and a corresponding increase in the volume of fluid in the pressure chamber 212. No substantial net change in volume occurs. Any net change in volume is due to slight differences in sheave displacement resulting from differences in dimensions and geometries.

To achieve a shifting of the primary sheave toward the downshift position, pressure chamber 164 is pressurized. To achieve a shift of the primary sheave assembly toward the upshift position, pressure chamber 166 is pressurized. The control of pressurized fluid for the upshift chamber and the downshift chamber will be explained with reference to the valve diagram of FIGS. 2A, 2B and 2C.

The left-hand end of the shaft 186 is received in a recess formed in a manifold portion 220 of the housing 62. Pressure distributor tubing 222 establishes fluid communication between pressure supply and exhaust porting formed in the manifold 220 and the exhaust and pressure sides of the piston plate 200 for the secondary sheave assembly.

Figure 2A:
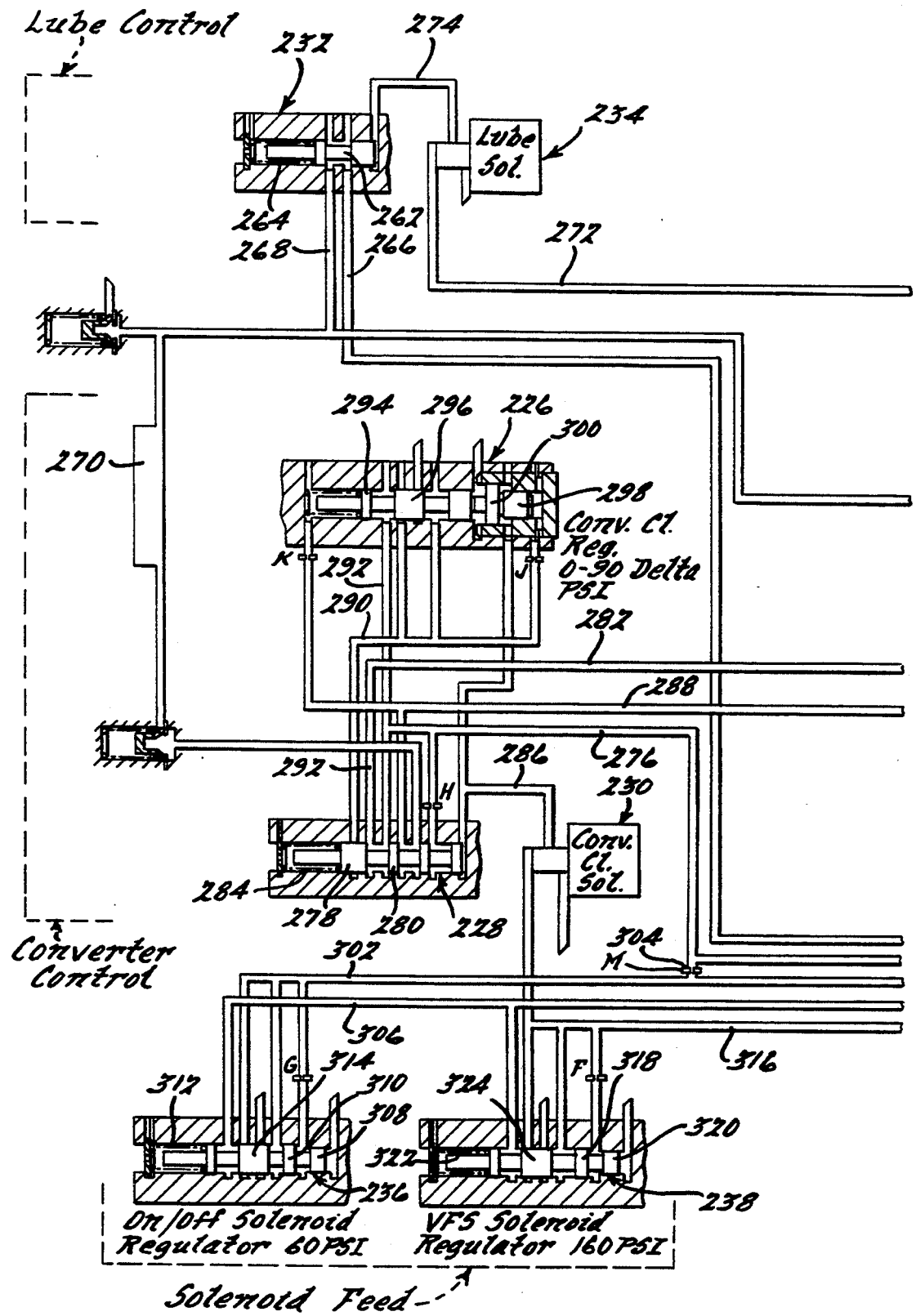

The valve control system of FIGS. 2A, 2B and 2C comprises a lube control, a converter control, a solenoid feed control, a range control, a ratio control and a pump control. These separate regions of the valve system have been indicated by appropriate legends in FIGS. 2A, 2B and 2C. The converter control comprises a converter clutch regulator valve assembly 226, a converter clutch control valve 228 and a variable force (VFS) solenoid valve 230. The lube control comprises an on-off type lube flow control valve 232 and an on-off lube solenoid valve control 234.

The solenoid feed circuit comprises an on-off solenoid regulator valve 236 and a variable force solenoid (VFS) regulator valve 238.

The range control portion of the circuit comprises a forward clutch regulator valve 240, a VFS engagement solenoid valve 242 and a reverse band regulator valve 244.

The ratio control portion of the circuit includes a ratio valve 246 and a ratio solenoid valve (VFS) 248. The pump control includes a converter regulator valve 250 and a sheave regulator valve 252.

The stall solenoid valve, which is a VFS solenoid valve, is shown at 254 and a primary exhaust valve is shown at 256. An on-off primary exhaust solenoid valve 258 controls the valve 256.

A conventional drive range selector valve or manual valve is shown in FIG. 2B at 260. This forms a part of the range control valve system. It can be adjusted to various positions; i.e., a low range position, a drive range performance position, a drive range economy position, a neutral position and a reverse position. In the position shown in FIG. 2B, the manual valve is in the neutral position.

The lube control valve 232 comprises a valve spool 262. It normally is urged in a right-hand direction by valve spring 264 so that communication is established between lube pressure line 266 and lube pressure line 268, the latter extending to the cooler 270.

On-off lube solenoid valve 234 comprises a solenoid pressure supply passage 272 and an output signal passage 274. The passage 274 normally is at low pressure or zero pressure. When the valve 234 is actuated, pressure is distributed from the solenoid supply pressure passage 272 to the right-hand end of the valve spool 262 which shifts the valve in a left-hand direction, thereby shutting off the lubrication flow to the cooler. This occurs when the engine is idling, thus preventing unneeded fluid flow and avoiding a drain down of the valve body sump when the engine idles.

The bypass clutch 28 is engaged by circuit pressure in the toroidal circuit for the torque converter 16. When a pressure differential exists across the lock-up clutch piston plate 30 due to high pressure in the toroidal circuit and a lower pressure in the clutch release chamber defined by the piston plate 30 and the adjacent impeller shell housing, the bypass clutch is frictionally engaged. The pressure in the converter bypass clutch release chamber behind the bypass clutch plate 30 is controlled by the converter clutch regulator valve 226. Valve 226 is supplied with a regulated converter pressure from regulator valve 250 through passage 276.

The converter flow control valve 228 has valve lands 278 and 280 that establish communication between passage 276 and passage 282, which extends to the converter clutch release chamber. In FIG. 2A, the valve 226 is shown in a position corresponding to the converter bypass clutch "off" position. It is urged in that position by valve spring 284. When the bypass clutch is "on", the variable force solenoid output pressure in passage 286 will shift the valve 228 in a left-hand direction. Regulated converter pressure in passage 276 then is distributed through the valve 228 to passage 288, thereby pressurizing the toroidal circuit. Pressure in the converter clutch release chamber, as mentioned above, is regulated by the valve 226 as regulated pressure in passage 290 is distributed through the valve 228 to the passage 292.

Supply pressure, which is a regulated output pressure from the valve 250, is distributed through passage 276 and through passage 292 to the valve 226. The degree of communication between passage 290 and 292 is controlled by lands 294 and 296 on the valve 226. Feedback pressure in passage 292 is distributed to the right-hand end of the valve 226 where it acts on land 298.

The variable force solenoid output pressure in passage 286 acts on a differential area of lands 298 and 300 so that the regulated output pressure in passage 290, which is distributed to the release side of the bypass clutch, depends upon the magnitude of the pressure developed by the variable force solenoid 230.

The on-off solenoids, one of which is shown at 234, are supplied with pressure through passage 302. Converter regulator supply passage 276 communicates with passage 302 through flow control orifice 304 so that the converter will continue to be supplied with fluid even when the converter regulator valve is closed. Line pressure is distributed to the on-off solenoid regulator 236 through passage 306. Valve 236 establishes a pressure of about 60 psi in line 302. The pressure in passage 302 acts on a differential area of lands 308 and 310, which opposes the force acting on the valve by valve spring 312. The pressure regulating action for the valve 236 is established as the degree of communication between passage 306 and passage 302 is controlled by land 314.

The variable force solenoid valves are supplied with pressure from the variable force solenoid regulator valve 238. As in the case of the valve 236, the valve 238 is supplied with line pressure from passage 306. Regulated pressure in passage 316 acts on the differential area of lands 318 and 320 establishing a force that opposes the force of valve spring 322. Land 324 controls the degree of communication between the line pressure passage 306 and the variable force solenoid regulated pressure passage 316. The variable force solenoid regulator 238 regulates the pressure in passage 316 at a value of about 160 psi.

When the manual valve is moved to a forward drive range position, line pressure is distributed to passage 326, which extends in the forward clutch regulator valve. Line pressure is supplied to the range selector valve 260 through passage 328, which communicates with line pressure passage 306 described previously. The supply pressure for the forward clutch regulator valve in passage 326 is distributed between lands 330 and 332. Land 332 controls the degree of communication between passage 326 and forward clutch feed passage 334. Feedback pressure is distributed to the right-hand side of land 336 through damper orifice 338. The feedback pressure supplements the force of valve spring 340. The calibration of the forward clutch regulator valve determines the magnitude of the pressure in the forward clutch feed passage 334.

Variable force solenoid 242, which is supplied with feed pressure from passage 316, determines the magnitude of the pressure in passage 342. That pressure acts on the left side of land 344 of the forward clutch regulator valve 240. The variable force solenoid thus is able to control the rate of engagement of the forward clutch.

If the converter is stalled, extra clutch capacity is required. Thus, an auxiliary boost pressure is distributed through passage 346 to the differential area of lands 344 and 347. The pressure in passage 346 is obtained from the stall solenoid 254 shown in FIG. 2C.

The stall solenoid is a variable force solenoid that is supplied with feed pressure from passage 316. This increases the capacity of the clutch when the converter is stalled because of the resulting increase in the regulated output pressure of the forward clutch regulator valve.

The reverse band regulator valve 244 controls the engagement of the reverse brake to cause the brake band to engage smoothly. It receives line pressure through passage 348 when the manual valve or the selector valve 260 is shifted in a right-hand direction, thus establishing communication between passage 328 and passage 348. Line pressure then is delivered to the valve 244 between lands 350 and 352.

Land 352 controls the degree of communication between passage 348 and passage 356, which extends to the reverse brake band. Feedback pressure from passage 356 is distributed through damper orifice 358 to the differential area of lands 360 and 362. Valve spring 364 normally urges the reverse band regulator valve in a left-hand direction.

Stall solenoid 254 delivers a boost pressure to the reverse band regulator valve through passage 366. In this respect, the boost feature for the reverse band regulator valve corresponds to the boost feature for the forward clutch regulator valve.

Engagement of the reverse band is controlled by the variable force solenoid engagement valve 242. The output of that VFS valve is distributed to the left-hand side of the land 368 through passage 370.

As seen in FIG. 2B, large pump 70 and small pump 72 have a common pump inlet passage 372. The discharge or high pressure passage for the large pump 70 is shown at 374. The corresponding high pressure discharge passage for small pump 72 is shown at 376.

Large pump high pressure passage 374 communicates with the inlet port 378 of the sheave regulator valve 252. Small pump high pressure passage 376 communicates with supply port 380 for the sheave regulator valve 252.

Valve 252 functions as a main regulator valve. Pressure in port 380 is distributed through orifice 382, which is a damper orifice, to the space between lands 384 and 386. These lands have a differential area, so the pressure in port 380 will create a force on the regulator valve spool 388 that is opposed by valve spring 390.

The pressure at port 378 communicates with the regulator valve 252 between lands 392 and 394. Converter regulator valve supply passage 396 communicates with the port 378. The degree of communication between port 378 and passage 396 is controlled by the land 392.

When the spool 388 is positioned to the right, communication between port 378 and passage 396 is interrupted.

Land 394 controls the degree of communication between port 380 and converter regulator supply passage 398. High pressure passage 374 for the large pump communicates with the high pressure passage 376 for the small pump through a one-way flow check valve 400, which normally is closed by valve spring 402.

As the speed of the engine increases, both pumps are used to satisfy the load requirements of the regulator valve 250. When the flow developed by the small pump is sufficient to supply the needs of the control system, the land 392 will open communication between port 378 and passage 396. At that time, the pressure requirements are satisfied only by the pressurized fluid in passage 376, which is regulated by the land 394. When the pressurized flow requirement can be satisfied by the small pump, land 394 will uncover passage 398, thereby dumping pressurized fluid into passage 398.

The converter regulator 250 acts in a manner similar to the operation of valve 252. Valve 250 includes valve lands 404, 406 and 408 located on a valve spool 410, which is biased in a right-hand direction, as seen in FIG. 2C, by valve spring 412. Land 406 controls the degree of communication between passage 398 and passage 414, which leads to the common pump inlet passage 372. Thus, the pressure in passage 398 is a regulated pressure that is distributed to passage 276 for the converter clutch regulator.

The sheave solenoid valve, which is a variable force solenoid valve, is shown at 416. As in the case of the other variable force solenoid valves, it is supplied with pressure in passage 316. That pressure is regulated by the variable force solenoid regulator 238, as explained previously. The variable force solenoid valve 416 responds to a control signal from the microprocessor, which infers engine torque as a function of input torque, converter torque ratio and belt ratio. The output from the variable force solenoid valve 416 is distributed to passage 418. The pressure in passage 418 can vary between 100 psi to 550 psi.

The pressure in passage 418 acts on the differential area of lands 404 and a smaller land 420 on the regulator valve 250. This establishes a force on the spool 410 which supplements the force of the spring 412. Thus, the output pressure regulated by the regulator 250 depends upon the magnitude of the input torque, torque converter ratio and belt ratio. The pressure in passage 418 also acts on valve land 422 for the regulator valve 252, thus creating a force that complements the force of the valve spring 390 and increases the regulated pressure of valve 252 when an increase in torque is sensed based upon the input torque, the converter ratio and the belt ratio.

The stall solenoid 254 controls the line pressure when the converter is stalled. This will increase the forward clutch capacity and the reverse clutch capacity. The presence of the valve 254 in the system makes it unnecessary for the variable force solenoid valve 416 to have a high gain difference for providing an unusual increase in the clutch and brake capacity required when the converter is stalled. This simplifies the design of the solenoid valve 416.

The ratio valve 246 functions to control distribution of pressurized fluid from ratio valve supply passage 422 to the upshift pressure distributor passage 424 and to the downshift pressure distributor passage 426. Passage 424 communicates with the upshift or overdrive pressure chamber 166, shown in FIG. 1B; and passage 426 communicates with the downshift or underdrive pressure chamber 164, shown in FIG. 1B. Communication between passage 422 and each of the passages 424 and 426 is controlled by valve land 428 and valve land 430, respectively. These lands are formed on valve spool 432, which is urged in a right-hand direction by valve spring 434. A pressure force acts on the right-hand side of the valve land 436, which opposes the force of the spring 434. That force is produced by the ratio solenoid valve 248, which is a variable force solenoid supplied with pressure from the common feed passage 316 for the variable force solenoids. The output pressure of the ratio solenoid 248 is distributed to the ratio valve through passage 438.

The solenoid 248 is under the control of the microprocessor. It responds to the output signal of the microprocessor to change ratio in an upshift direction or a downshift direction, depending upon the operating conditions that are sensed by the sensors that provide input signals to the microprocessor.

The sheave flow limit valve is shown at 440. It is supplied with fluid from passage 328. It is on the upstream side of the ratio valve and is adapted to control communication between supply passage 328 and supply passage 422 for the ratio valve. Passage 328 is supplied with line pressure whenever the manual valve is in a forward drive range position or a reverse position.

The flow limit valve comprises a valve spool 442, which has spaced valve lands 444, 446 and 448. The right-hand side of the land 444 is exhausted through port 450. Lands 444 and 446 have a differential area that is supplied with fluid from passage 328 through damper orifice 452.

The left-hand side of the land 448 is subjected to the output pressure of the sheave solenoid valve 416. Pressure from the valve 416 is delivered to the sheave flow limit valve through passage 454.

The sheave flow limit valve regulates pressure in the sheaves at 80% of line pressure. If the pressure in passage 454 that is commanded by the microprocessor is such that the value of the line pressure is greater than 80% of the commanded value, the sheave flow limit valve will permit free communication between passage 328 and passage 422. If the line pressure should fall below 80% of the commanded value, the valve 440 will begin to regulate so that 80% of the line pressure will be maintained.

As best seen in FIG. 2C, valve land 448 has centering grooves 456, which help to reduce valve friction. Further, the exit port 458, which communicates with the passage 422, is provided with "V" notches 460, which provide valve stability when the valve is regulating. The notches 460 will provide for a gradual closing off of the port 458 as the valve land 456 shifts in a right-hand direction upon a loss of line pressure.

The solenoid logic is summarized in FIG. 3A. The operating states of the stall solenoid, the shift solenoid and the engagement solenoid will produce various sheave capacities. This will result also in various forward and reverse clutch capacities as summarized. Further, the converter clutch logic and the ratio solenoid logic is summarized in FIG. 3A.

The primary exhaust valve 256 controls communication between the line pressure chamber for the primary servo and the line pressure chamber for the secondary servo. Upon a ratio change toward the overdrive condition, the line pressure chamber for the primary sheave increases in volume. This of course corresponds to a decrease in volume for the line pressure chamber for the secondary sheave.

Valve 256 comprises a valve spool 457 having spaced lands 459 and 461, which control communication between passages 462 and 464. These respectively communicate with the primary sheave line pressure chamber and the secondary sheave line pressure chamber. Valve 256 is shown in FIG. 2B in its normal position. The primary exhaust solenoid valve 258, which is an on-off solenoid, communicates with on-off solenoid supply pressure passage 272 and distributes a signal to passage 466. The force developed by the signal in passage 466 is opposed by valve spring 468. The valve 258 exhausts the primary sheave pressure chamber during a hard vehicle braking situation.

FIG. 3B summarizes the functions of the various orifices, which are designated by letters A–M. These letters are indicated also in the circuit drawings of FIGS. 2A, 2b and 2C. Orifices A–G are merely damper orifices that are used to establish valve stability. Orifice H sets the cooler flow when the converter is locked. Orifice J is another damper orifice for the converter clutch regulator. Orifice K restricts the flow from the converter regulator to the converter clutch regulator valve. Orifice M provides a feed to the converter regulator when the converter regulator valve is closed.

Figure 4A:
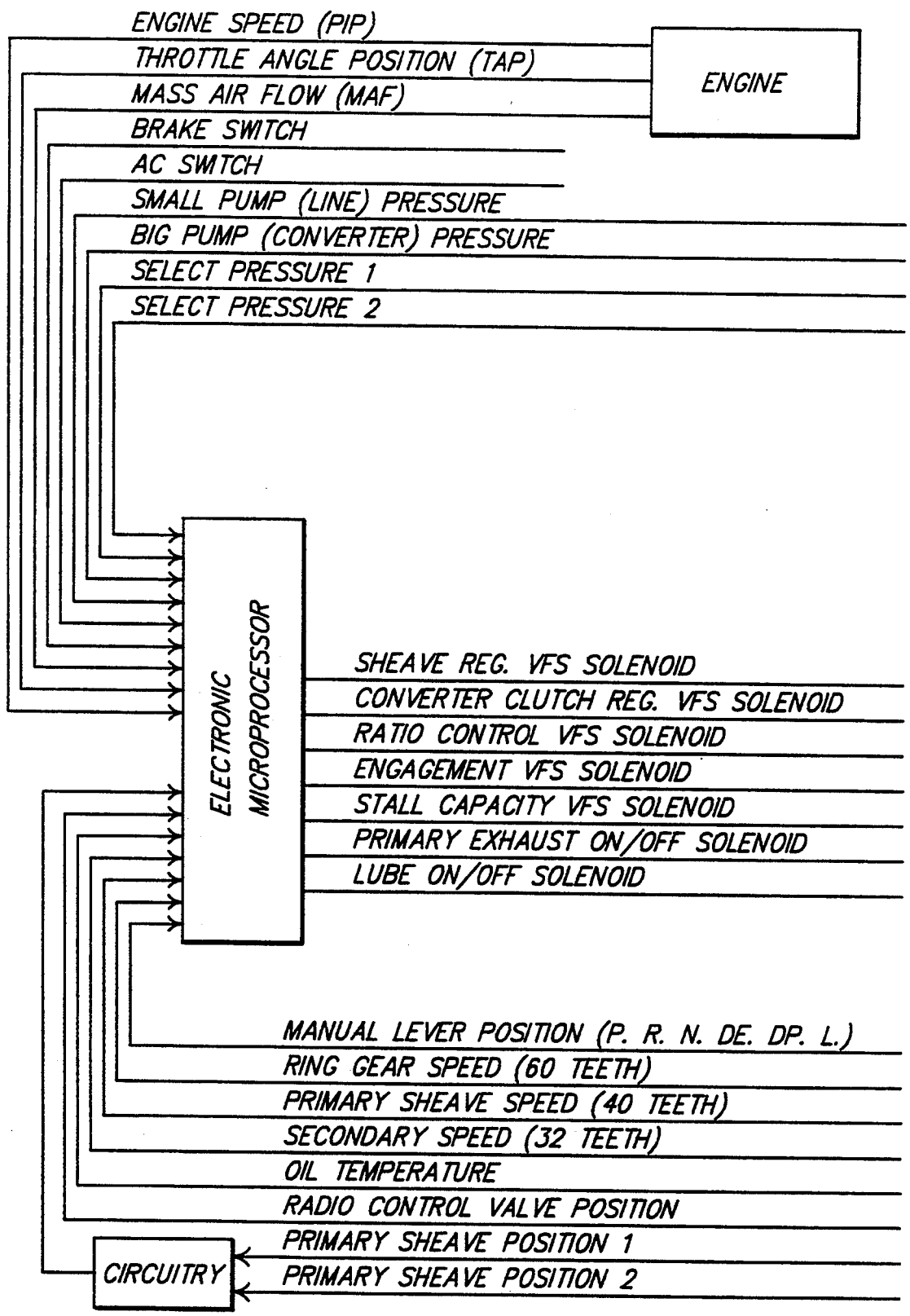
FIGS. 4A and 4B show a schematic control overview of the electronic microprocessor, the electrohydraulic controls, the engine and the infinitely variable transmission assembly.
Figure 4B:
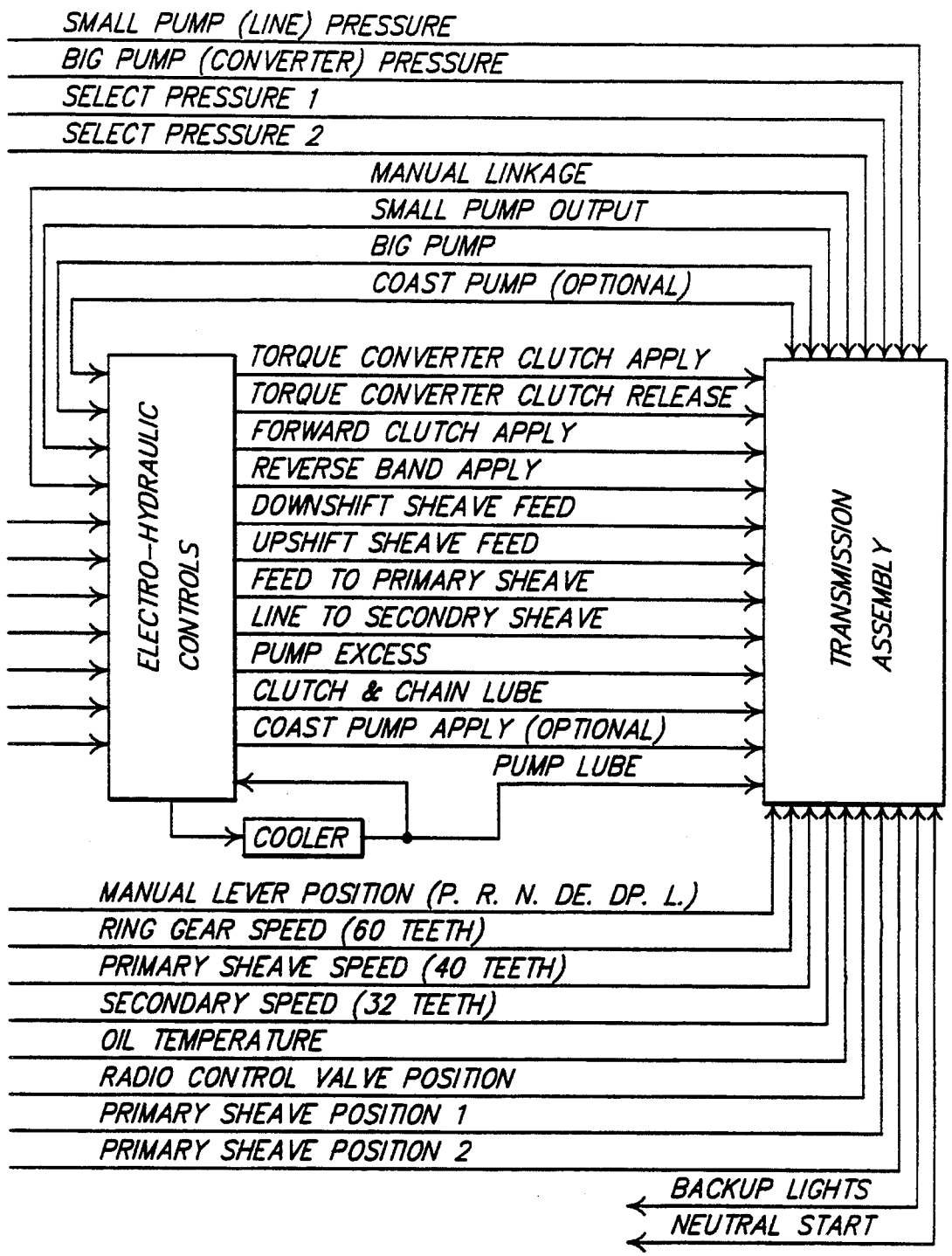

FIGS. 4A and 4B show a control overview including the microprocessor, the electrohydraulic controls, the transmission and the throttle-controlled internal combustion engine. The input signals to the microprocessor have been labeled, as are the output signals delivered from the microprocessor to the electrohydraulic controls, including the VFS and on-off solenoids. The signals from the electrohydraulic controls to the transmission assembly have been indicated by functional statements in FIG. 4B.

The microprocessor has a memory that stores a control algorithm and a central processor unit that acts on the input signals in accordance with the algorithm to develop the microprocessor output signals.

Figure 2D:
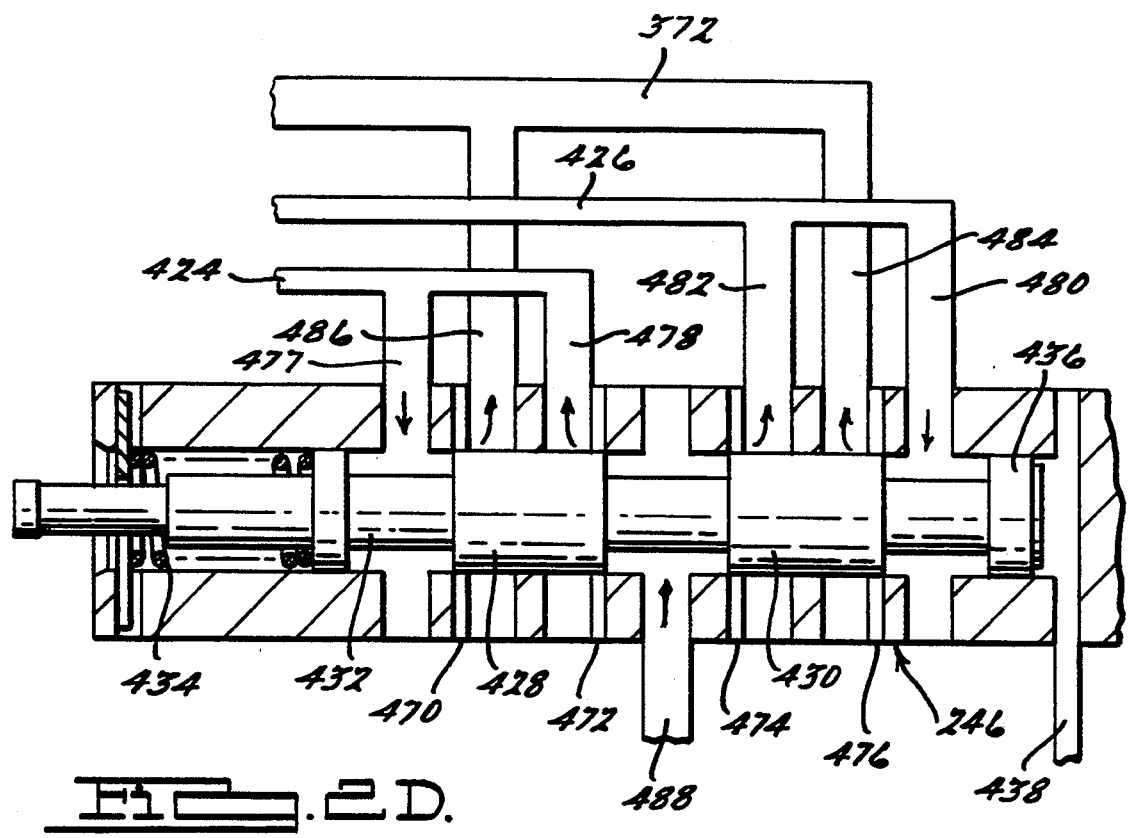
FIG. 2D is a detailed view of the ratio control valve that forms a part of the valve system of FIGS. 2A, 2B and 2C.

In FIG. 2D, the ratio control valve is shown in an enlarged view. Included in FIG. 2D is a series of directional arrows that show the direction of flow exiting from the ratio valve. On an upshift, the flow is directed from the valve to the upshift chamber through passage 424. On a downshift, flow is directed from the ratio control valve to the downshift passage 426. The pump suction side communicates with the ratio control valve through passage 372.

Land 428 on the valve spool 432 registers with V-shaped notches 470 to establish controlled communication between upshift chamber pressure passage 424 and the ratio control valve. During a downshift, fluid flows from passage 424 through branch passage 477 toward the ratio control valve. During an upshift, pressure is distributed from the ratio control valve through branch passage 478. At that time, fluid from the downshift chamber passes through passage 426 and through branch passage 480 toward the ratio control valve. On a downshift, pressure is distributed from the ratio control valve to the downshift pressure passage 426 through branch passage 482.

Pump suction passage 372 is common for upshifts and downshifts. Fluid passes to the passage 372 from the ratio control valve through each of two branch pump suction pressure passages 484 and 486.

It will be observed from FIG. 2D that flow from the ratio control valve is metered by either land 428 or 430. It will be observed also from FIG. 2D that the direction of the flow from the valve is such that the flow from the valve is restricted, whereas the flow to the valve from either the downshift chamber, the upshift chamber or from the sheave flow limit valve enters the valve cavity of the ratio control valve unrestricted. The passage 422, which leads from the sheave flow limit valve, communicates with the valve cavity for the ratio control valve through port 488.

The V-shaped notches at each edge of the land 430 and the V-shaped notches at each end of the land 428 provide a smooth control transition between flow direction changes as the valve spool 432 is shifted in response to the solenoid output pressure in passage 438. The valve spring 434 opposes the force of the pressure in passage 438.

The solenoid output pressure for the ratio control solenoid valve at 248 is normally high. Thus, if there is an electrical failure and power to the solenoid valve is interrupted, the pressure in passage 438 will assume a high value, thereby shifting the spool 432 toward the overdrive position. Thus, the ratio valve defaults to the overdrive ratio in the absence of electrical power.

The variable force solenoid valve 242, which is the engagement solenoid, is a normally high pressure solenoid. Thus, a loss of power will result in an increase in the friction brake band pressure and the forward clutch pressure. In contrast, the variable force solenoid 230 has a normally low output pressure. That solenoid, as explained earlier, controls the converter flow and the converter clutch regulator pressure.

When the ratio control solenoid pressure increases beyond the steady state range, indicated in FIG. 2G as the "null" state, the flow again increases with a generally linear relationship as shown at 492.

The transition from the flow characteristic shown in 490 to the null state is characterized by a gradual transition, as shown at 494. Similarly, a gradual transition occurs at 496 as the flow to the upshift chamber takes place upon an increase in the ratio valve solenoid pressure. The gradual transition into and out of the null state is achieved by the V-shaped notches 470, 472, 474 and 476.

Figure 2E:
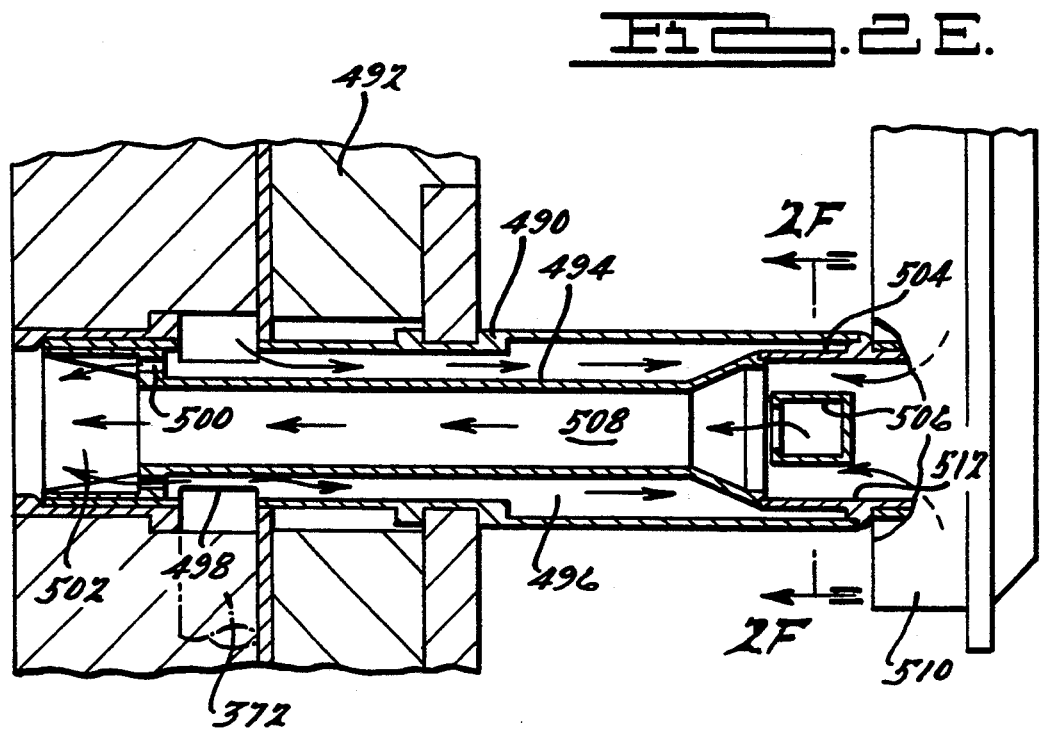
FIG. 2E is a schematic cross-sectional view of the fluid connection between the ratio control valve outlet and the pump inlet.

As seen in FIG. 2E, the pump inlet passage 372, which communicates with the outlet side of the ratio valve as explained previously, extends to the pump inlet passage structure, which includes a pump supply tube 490 extending within an opening formed in control valve body 492. The tube 490 surrounds tube 494, thus defining an annular flow passage 496. The left-hand end of passage 496 communicates with passage 372 through a port 498.

The flow at port 498 is split into two components, as indicated by the directional arrows. One component passes through openings 500, which directs oil to pump inlet opening 502. The balance of the oil passing through passage 372 is distributed to the annular flow passage 496. The flow passing through passage 496 enters a throat section 504. It then passes through radial openings 506 into the interior flow passage 508.

The flow is accelerated as it passes through the throat section 504 and is directed through passage 508 toward the pump inlet. The velocity pressure of that fluid creates a static pressure increase or supercharge at the pump inlet so that the pump inlet acts at a static pressure greater than atmospheric. This reduces the pumping horsepower for any given flow capacity at a given pressure.

The passage 508 acts as a mixing chamber for excessive line pressure oil from the main regulator, oil that is transferred from the ratio control valve and the filtered sump oil that is drawn from fluid sump 510. As fluid is accelerated through the ports 506 and through the passage 508, negative pressure induces oil from the sump 510 into the inlet 512 for the passage 508. The flow of filtered sump oil is indicated in FIG. 2E by the dotted directional flow arrows.

Having described a preferred embodiment of my invention, what I claim and desire to secure by U.S. Letters Patent is:

1. A control system for a continuously variable transmission having a primary friction sheave assembly and a secondary friction sheave assembly, a drive belt drivably connecting said sheave assemblies, primary servo means for adjusting the pitch radius of said primary sheave assembly, secondary servo means for adjusting the pitch radius of said secondary sheave assembly;

said control system comprising a pump, a control valve circuit connecting each servo means with said pump;

each sheave assembly including a pressure chamber of expansible volume, an increase in the pitch radius of one sheave assembly being accompanied by a decrease in the pitch radius of the other sheave assembly;

said primary servo means comprising an upshift pressure chamber and a downshift pressure chamber; and a ratio control valve means in said valve circuit for controlling distribution of pressure to said upshift and downshift pressure chambers from said pump;

said ratio control valve means comprising a valve chamber, a movable valve spool in said valve chamber, a pair of valve lands with flow metering edges on said spool, flow exit ports in said valve chamber adapted to register with said flow metering edges, and flow inlet ports in said valve chamber at locations adjacent said lands whereby inlet flow to said valve chamber is unrestricted by said lands.

2. A continuously variable transmission for a vehicle having an engine comprising a primary sheave assembly connected drivably to said engine and a secondary sheave assembly connected drivably to a driven member, a drive belt drivably connecting said sheave assemblies, primary servo means for adjusting the pitch radius of said primary sheave assembly, secondary servo means for adjusting the pitch radius of said secondary sheave assembly;

a control system for controlling transmission ratio comprising a pump, a control valve circuit connecting each servo means with said pump;

each sheave assembly including a pressure chamber of expansible volume, an increase in the pitch radius of one sheave assembly being accompanied by a decrease in the pitch radius of the other sheave assembly;

said primary servo means comprising an upshift pressure chamber and a downshift pressure chamber; and a ratio control valve means in said valve circuit for controlling distribution of pressure to said upshift and downshift pressure chambers from said pump;

said ratio control valve means comprising a valve chamber, a movable valve spool in said valve chamber, said valve chamber having first and second ports communicating with said upshift chamber, third and fourth ports communicating with said downshift chamber, and outlet porting communicating with the inlet side of said pump;

said valve spool having flow metering lands registering with said outlet porting and with said second and fourth ports, the flow of fluid toward said valve chamber from said pump and toward said first port and said third port from said upshift and downshift chambers, respectively, being unrestricted by said lands.

3. The combination as set forth in claim 1 wherein said control system comprises an electronic controller including means responsive to operating variables of said transmission for developing a control pressure signal that is an indication of a commanded transmission ratio, said valve circuit including means for subjecting said valve spool to said control pressure signal whereby the position of said valve spool is determined by said control pressure signal.

4. The combination as set forth in claim 2 wherein said control system comprises an electronic controller including means responsive to operating variables of said transmission for developing a control pressure signal that is an indication of a commanded transmission ratio, said valve circuit including means for subjecting said valve spool to said control pressure signal whereby the position of said valve spool is determined by said control pressure signal.

5. A continuously variable transmission for a vehicle having an engine comprising a primary sheave assembly connected drivably to said engine and a secondary sheave assembly connected drivably to a driven member, a drive belt drivably connecting said sheave assemblies, primary servo means for adjusting the pitch radius of said primary sheave assembly, secondary servo means for adjusting the pitch radius of said secondary sheave assembly;

a control system for controlling transmission ratio comprising a pump, a control valve circuit connecting each servo means with said pump;

each sheave assembly including a pressure chamber of expansible volume, an increase in the pitch radius of one sheave assembly being accompanied by a decrease in the pitch radius of the other sheave assembly;

said primary servo means comprising an upshift pressure chamber and a downshift pressure chamber;

a ratio control valve means in said valve circuit for controlling distribution of pressure to said upshift and downshift pressure chambers from said pump;

said ratio control valve means comprising a valve chamber, a movable valve spool in said valve chamber, said valve chamber having first and second ports communicating with said upshift chamber, third and fourth ports communicating with said downshift chamber, and outlet porting communicating with the inlet side of said pump;

said valve spool having flow metering lands registering with said outlet porting and with said second and fourth ports, a pump inlet flow passage connecting said inlet side of said pump with said third port, and flow directing means in said inlet flow passage for converting velocity pressure in said inlet flow passage into an increased static pressure at said inlet side of said pump thereby supercharging said pump.

6. The combination as set forth in claim 4 including a pump inlet flow passage connecting said inlet side of said pump with said third port, and flow directing means in said inlet flow passage for connecting velocity pressure in said inlet flow passage into an increased static pressure at said inlet side of said pump thereby supercharging said pump.

7. The combination as set forth in claim 6 including a sump and filter assembly, said inlet flow passage being in fluid communication with said sump and filter assembly, said flow directing means being adapted to induce filtered oil from said sump and filter assembly into said inlet side of said pump.

* * * * *